(12) United States Patent
Li et al.

(10) Patent No.: US 9,344,286 B2
(45) Date of Patent: May 17, 2016

(54) MULTICAST DATA FORWARDING METHOD AND DEVICE SUPPORTING VIRTUAL TERMINAL

(75) Inventors: Lin Li, Shenzhen (CN); Yuehua Wei, Shenzhen (CN); Jinghai Yu, Shenzhen (CN); Ting Ao, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 357 days.

(21) Appl. No.: 14/004,489

(22) PCT Filed: Mar. 7, 2012

(86) PCT No.: PCT/CN2012/072026
§ 371 (c)(1),
(2), (4) Date: Sep. 11, 2013

(87) PCT Pub. No.: WO2012/122911
PCT Pub. Date: Sep. 20, 2012

(65) Prior Publication Data
US 2014/0003428 A1 Jan. 2, 2014

(30) Foreign Application Priority Data

Mar. 11, 2011 (CN) .......................... 2011 1 0060292

(51) Int. Cl.
*H04L 12/18* (2006.01)
*H04L 12/761* (2013.01)
*H04L 12/54* (2013.01)
*H04L 12/931* (2013.01)
*H04L 12/28* (2006.01)

(52) U.S. Cl.
CPC .............. *H04L 12/18* (2013.01); *H04L 12/287* (2013.01); *H04L 12/56* (2013.01); *H04L 45/16* (2013.01); *H04L 49/201* (2013.01)

(58) Field of Classification Search
None
See application file for complete search history.

(56) References Cited

U.S. PATENT DOCUMENTS 8,798,064 B2 * 8/2014 Agarwal ................ H04L 49/70
370/392

FOREIGN PATENT DOCUMENTS

| CN | 1606849 A | 4/2005 |
|---|---|---|
| CN | 1852240 A | 10/2006 |
| WO | 2010099407 A1 | 9/2010 |

OTHER PUBLICATIONS

Draft Standard for Local and Metropolitan Area Networks, Virtual Bridged Local Area Networks—Amendment: Bridge Port Extension; Dec. 23, 2010; pp. 1-176.*

(Continued)

*Primary Examiner* — Timothy J Weidner
(74) *Attorney, Agent, or Firm* — Ling Wu; Stephen Yang; Ling and Yang Intellectual Property

(57) ABSTRACT

Disclosed are a multicast data forwarding method and device supporting a virtual terminal. The method includes: a bridge forwarding module receiving multicast data sent by an end station and determining output ports; when a certain output port is the same with the input port of the multicast data and the input port has enabled reflective relay function, not carrying Ingress extended channel identifier (Ingress_E-CID) in the forwarded message information or the value of the Ingress_E-CID being zero. By modifying the source port filtering mechanism, the present invention enables a Port Extender (PE) supporting the virtual terminal technology to transmit and receive data normally while multicasting.

20 Claims, 5 Drawing Sheets

(56) References Cited

OTHER PUBLICATIONS

Remote Replication issue of EVB using E-channel; Mar. 14, 2011; pp. 1-9; http:/www.ieee802.org/1/files/public/docs2011/bh-li-source-filtering-issue-0.*

International Search Report for PCT/CN2012/072026 dated May 21, 2012.

Remote Replication issue of EVB using E-channel, Mar. 14, 2011, [retrieved date May 21, 2012], retrieved from the Internet: http://www.ieee802.org/1/files/public/docs2011/bh-li-source-filtering-issue-0, the whole document.

Draft Standard for Local and Metropolitan Area Networks ; Virtual Bridged Local Area Networks—Amendment: Bridge Port Extension. Dec. 23, 2010, pp. 1-176, XP017638620.

Draft Standard for Local and Metropolitan Area Networks ; Virtual Bridged Local Area Networks—Amendment XX: Edge Virtual Bridging. Mar. 10, 2011, pp. 1-172. XP017638588.

Edge Virtual Bridging; evb-tutorial-draft-20091116_v09, Nov. 17, 2009, pp. 1-54, XP017655201.

P802.1 Qbh Draft 0.0 Introduction; Joe Pelissier, Jan. 2010.

* cited by examiner

MULTICAST DATA FORWARDING METHOD AND DEVICE SUPPORTING VIRTUAL TERMINAL

TECHNICAL FIELD

The present invention relates to the field of mobile communication technology, and more particularly, to a multicast data forwarding method and device supporting virtual terminal.

BACKGROUND OF THE RELATED ART

With the development of data communication networks, network bandwidth is growing and there are more and more terminal devices. In order to reduce costs and converge the networks, the concept of data center has been proposed and supported by operators and equipment manufacturers, and it has good a prospect for development. As the equipment supporting the next generation data center Ethernet, the DCB (Data Center Bridging) needs to meet the requirements of the next generation data center network, including the support for significantly increasing terminal server devices.

To this end, IEEE802.1 DCB task group created two standard projects, namely IEEE 802.1 Qbh and IEEE802.1Qbg, to solve this problem. The Qbh standard defines Ethernet switch with extended ports to adapt to the ever-increasing demands for terminal device interfaces. The standard defines the Ethernet switch port extender module, and remote replication technology for multicast. The Qbg standard defines the edge virtual bridging (EVB) technology and standardizes the automatic discovery and configuration flow between end stations using the virtualization technology and switches connected with them. An end station supporting the EVB technology can comprise a group of virtual machines (VM), which are connected with an edge Ethernet switch through a virtual edge switch (VEB) or virtual edge port aggregator (VEPA). The VEPA technology requires that the switches support the Reflective Relay function, that is, forwarding the data out from the port at which the data is received.

FIG. 1 shows a schematic diagram of applying port extension to an Ethernet switch, and the part summarized in bold line is the Ethernet switch with extended port (Extended Bridge). The Extended Bridge comprises a bridge forwarding module such as the VLAN-aware Bridge Component and one or more Port Extenders, all of which constitute a controlling bridge, and there are at least one or more Port Extenders outside the Controlling Bridge. The Port Extenders inside the Controlling Bridge are called as internal Port Extenders, and the others are called as external Port Extenders. FIG. 1 shows a situation of one Controlling Bridge and two external Port Extenders. A group of instantiated ports connected between the VLAN-aware Bridge Component and the internal Port Extenders are called as a replication group. The End Station may be a single physical terminal or a device having a plurality of logical terminals that have realized virtualization.

SUMMARY OF THE INVENTION

The direction from left to right in FIG. 1 is the output direction from the bridge to the end station. The port connected between a Port Extender and a lower level cascaded Port Extender is called as a Cascade Port. The port connected between a Port Extender and the Cascade Port of the upper level Port Extender is called as an Upstream Port. The port connected between the Internal Port Extender and the VLAN-aware Bridge Component and that connected between the external Port Extender and the end station are called as Extended Ports. The external Port Extenders can be multi-layer cascaded to achieve more Extended Ports and more extended bridge external ports.

As shown in FIG. 1, when the VLAN-aware Bridge Component is aware of a Port Extender (Port Extender 2) being directly connected with it, it instantiates an internal Port Extender, namely Port Extender 1, to form a Controlling Bridge. When instantiating the Port Extender 1, an Extended Port connected with the VLAN-aware Bridge Component, i.e., port 1 on the Port Extender 1, is instantiated the Port Extender 1. Meanwhile, The VLAN-aware Bridge Component assigns an E-channel (Virtual Channel) for sending data to the external Port Extenders through the internal Port Extenders. For all external Port Extenders controlled by and connected with the Controlling Bridge, when the VLAN-aware Bridge Component finds out these Port Extenders, ports corresponding to their Extended Ports will be instantiated on the VLAN-aware Bridge Component. E-channels should be established between the Extended Port of the Port Extender 1 and the Cascade Port and Extended Port of the external Port Extender. The E-channel is identified with the E-CID (extended channel identifier). The E-CID is 14 bit, and when the value of the E-CID is in the range of 0-4095, it indicates that the E-channel is a unicast channel; when the value of the E-CID is greater than 4095, it is used for multicast and identifies a multicast group consisting of a number of unicast channels. The E-channel is a point-to-multipoint channel. The E-CIDs of these E-channel are allocated by the Controlling Bridge, and the E-CIDs used by the instantiated ports of the Port Extenders corresponding to the instantiated ports 1 to 5 of the VLAN-aware Bridge Component in FIG. 1 are respectively 2, 34, 96, 12 and 78. The values of the PCID (port extender channel identifier) parameters of the Extended Ports of the external Port Extender corresponding to these instantiated ports are equal to E-CIDs.

FIG. 2 illustrates the process of using the Extended Bridge to forward multicast data frames. When the data frame of a terminal device passes through an edge Port Extender (referring to the Port Extender directly connected to the End Station), the edge Port Extender will add an E-tag into the data frame, and the E-CID carried in the E-tag is the PCID of the port, and the E-CID carried in FIG. 2 is 67. The intermediate Port Extender passed by the data frame when being forwarded to the direction of the switch, such as the the Port Extender 2 shown in FIG. 2, after performing appropriate adding/deleting E-tag processing to the data frame, forwards the data frame to the Port Extender 1. After the data frame reaches the Port Extender 1, the E-tag is removed from the Extended Port and then the data frame is forwarded to the corresponding VLAN-aware Bridge Component instantiated port, i.e., the instantiated port 3. The instantiated port 3 of the VLAN-aware Bridge Component corresponds to the Extended Port 67 at which the data frame enters the Extended Bridge.

After said VLAN-aware Bridge Component receives said data frame, it searches the Filtering Database (FDB) forwarding table according to a destination address and a VID (VLAN identifier) to determine said data frame should be output from which instantiated port and generate a destination E-CID value of said forwarded data. For example, if said VLAN-aware Bridge Component determines that said multicast data should be sent from the instantiated ports 3, 4 and 5 to the Port Extender, it generates said destination E-CID value according to the instantiated ports 3, 4 and 5. Thereafter, said VLAN-aware Bridge Component transmits said destination E-CID value to said Port Extender of said Controlling Bridge via a connection identifier parameter (herein also referred to the forwarded message information) in the EM-UNITDATA.request primitive. If the port receiving said data and that sending the data belong to a same Replication Group, the E-CID and Ingress_E-CID (ingress extended channel identifier) of the port where the data is input are also sent to the Port Extender through said connection identifier parameter; otherwise, only the E-CID value is sent to the Port Extender via the connection identifier parameter. Wherein, the EM-UNITDATA.request primitive is called by the VLAN-aware Bridge Component to request the next forwarding module, namely the Port Extender of the Controlling Bridge, to forward said data.

All ports on the Port Extender have the attribute of belonging to the member set of a certain E-channel. For the received data frames, a port of the Port Extender filters and forwards the data frame according to the E-CID carried in said data frame. To avoid the data being repeatedly sent through multiple ports of said Port Extender of said Controlling Bridge, for an E-channel whose E-CID is greater than 4096, said Extended Port for connecting said Internal Port Extender with said VLAN-aware Bridge Component only has one port belonging to the member set of the E-channel. In this example, it is assumed that only the port 56 on the Port Extender 1 and said VLAN-aware Bridge Component belongs to the E-channel group identified by the E-CID. Thus, although multiple copies of multicast data are sent through the internal LAN between said VLAN-aware Bridge Component and said Port Extender 1, only one copy of data will be received by the port 56 belonging to the E-channel on said Port Extender 1 and arrive at a forwarding unit of said Port Extender.

Then, said Port Extender 1 generates an E-tag (extended tag) according to the connection identifier parameter in the EM-UITDATA.request primitive. The value of the destination E-CID carried in said connection identifier is filled in the E-CID field of said E-tag, and the value of the Ingress_E-CID is filled in the Ingress_E-CID field of said E-tag; if there is no Ingress_E-CID value, the Ingress-E-CID field is filled with 0. After the Port Extender 1 is added with said E-tag, said multicast data is sent out through the Cascade Port.

The specific format of said E-tag is shown in FIG. 3; wherein, the Ingress_E-CID field carries the source E-CID value. The E-CID field has the E-channel value, while multicasting, this value is greater than 4095. At the Port Extender2, in accordance with the E-CID value in said E-tag, said data is sent to all member set ports, which are ports 56 and 35 in FIG. 3, of the E-channel identified by said E-CID. Similarly, according to the E-CID value in said E-tag, at the Port Extender3, said data is sent to all member set ports, which are ports 74 and 67 in this example, of said E-channel identified by said E-CID.

It needs to perform source port filtering according to the source E-CID at the Extender Port of said Edge Extended Port to prevent the circulating loop of the multicast data. Specifically: checking the Ingress_E-CID field, if the value of this field is consistent with the PCID of this port, filtering said data; if the field has a value of 0, no source port filtering is performed. In the Extended Port 67 in this example, the value of the source E-CID carried in the E-tag is checked, if it is found to be consistent with the PCID of the local port, said data is filtered out.

If one Extended Port of the Port Extender is not directly connected with a certain separate end station, that is, one E-channel comprises data of several end stations, the multicast filtering mechanism will cause wrong filtering. For example, when a terminal device uses the VEPA technique defined in the Qbg standard, as shown in FIG. 4, in the case that a multicast group member comprises the End Stations 2, 3 and the VM1, VM3 in the End Station 4, and VM3 transmits multicast data, if the existing source port filtering technology is used, the VM1 cannot receive said multicast data.

The technical problem to be solved by the present invention is to provide a multicast data forwarding method and device supporting virtual terminal. By modifying the source port filtering mechanism, PE (Port Extension) supporting virtual terminal technology can transmit and receive the data normally while multicasting.

To solve the above-mentioned technical problem, the present invention provides a multicast data forwarding method supporting virtual terminal, comprising: a bridge forwarding module receiving multicast data sent by an end station and determining an output port, when a certain output port is the same with the input port of said multicast data, and said input port has enabled a reflective relay function, not carrying an ingress extended channel identifier (Ingress_E-CID) in said forwarded message information or a value of said Ingress_E-CID being equal to 0.

Preferably, said method further comprises:
said bridge forwarding module also determining a value of said extended channel identifier (E-CID) carried in said forwarded message information.

Preferably, said input port and output port belong to a same replication group.

Preferably, said bridge forwarding module refers to a VLAN-aware Bridge Component in a Controlling Bridge in an Ethernet switch.

Preferably, after an internal port extended forwarding module (Port Extender) of said Controlling Bridge receives said forwarded message information, it adds an extended tag (E-tag) into said multicast data according to said Ingress_E-CID carried in said forwarded message information;

after receiving said multicast data, an Extended Port of an Edge Port Extender checks the value of said Ingress_E-CID in said E-tag, if the value of said Ingress_E-CID is consistent with the port extended channel identifier (PCID) of said extended port, said data is filtered out.

The present invention also provides a multicast data forwarding method supporting virtual terminal, comprising: a bridge forwarding module receiving multicast data sent by an end station and determining an output port, when a certain output port is the same with the input port of said multicast data and said input port has disabled a reflective relay function, carrying an ingress extended channel identifier (Ingress_E-CID) in said forwarded message information and a value of said carried Ingress-E-CID being equal to the E-CID when said multicast data is inputted.

Preferably, said method further comprises:
said bridge forwarding module also determining the value of said extended channel identifier (E-CID) carried in said forwarded message information.

Preferably, said input port and output port belong to a same replication group.

The present invention also provides a multicast data forwarding device supporting virtual terminal to be applied to an Ethernet switch, said device comprising a port determination unit and a forwarding determination unit in a bridge forwarding module, wherein, said port determination unit is configured to: receive multicast data sent by an end station and determine an output port;

said forwarding determination unit is configured to: according to said output port determined by said port determination unit, when a certain output port is the same with the input port of said multicast data and said input port has enabled a reflective relay function, not carry ingress extended channel identifier (Ingress_E-CID) in the forwarded message information or a value of said Ingress_E-CID equals to 0.

Preferably, said forwarding determination unit is further configured to: determine a value of said E-CID carried in said forwarded message information.

Preferably, said forwarding determination unit is further configured to: determine that said output port and input port belong to a same replication group.

Preferably, said bridge forwarding module refers to a VLAN-aware Bridge Component in a Controlling Bridge in an Ethernet switch; said device further comprises an edge port extended forwarding module, and an internal port extended forwarding module in said Controlling Bridge.

Said internal port extended forwarding module is configured to: after receiving said forwarded message information, according to said Ingress_E-CID carried in said forwarded message information, add an extended tag (E-tag) into said multicast data;

said edge port extended forwarding module is configured to: after receiving said multicast data from said extended port, check the value of said Ingress_E-CID value in said E-tag, and if the value of said Ingress E-CID value is consistent with the PCID of said extended port, filter said data out.

The present invention also provides another multicast data forwarding device supporting virtual terminal to be applied to an Ethernet switch, said device comprising a port determination unit and a forwarding determination unit in a bridge forwarding module, wherein, said port determination unit is configured to: receive multicast data sent by an end station and determine an output port;

said forwarding determination unit is configured to: according to said output port determined by said port determination unit, when a certain output port is the same with the input port of said multicast data and said input port has disabled a reflective relay function, carrying an ingress extended channel identifier (Ingress_E-CID) in said forwarded message information and a value of said Ingress-E-CID equals to the E-CID used when inputting said multicast data.

Preferably, said forwarding determination unit is further configured to: determine the value of said E-CID carried in said forwarded message information.

Preferably, said forwarding determination unit is further configured to: determine that said output port and input port belong to a same replication group.

The multicast data forwarding scheme provided in the embodiments of the present invention can transmit and receive multicast data normally through modifying the source port filtering mechanism in the scenario of supporting virtual terminal.

BRIEF DESCRIPTION OF DRAWINGS

The accompanying drawings described herein are used to provide a further understanding of the present invention and constitute a part of this application, the illustrative embodiments of the present invention and their description are used to explain the present invention and do not constitute an inappropriate limitation to the present invention. In the accompanying drawings.

PREFERRED EMBODIMENTS OF THE PRESENT INVENTION

The present invention specifically uses the following technical solutions:

When an end station using virtual terminal technology sends a non-unicast data frame to an Extended Bridge, the Port Extender which the data frame passes by adds/deletes an E-tag into/from it and forwards it to the Controlling Bridge. The internal Port Extender in the Controlling Bridge sends the data frame to a bridge forwarding module (VLAN-aware Bridge Component) based on the E-CID of said data frame from the corresponding instantiated port. Said VLAN-aware Bridge Component searches for the output port according to the destination address of the data frame and generates the destination E-CID value of the E-channel that forwards the data. Thereafter, said VLAN-aware Bridge Component sends the generated destination E-CID value via the EM-UNITDA-TA.request primitive to the Port Extender of the Controlling Bridge, and in order to effectively filter the source port, this message may also comprise the value of the Ingress_E-CID.

In addition to checking whether the input and output ports belong to the same Replication Group or not, the VLAN-aware Bridge Component also makes the following judgment: if an output port is the input port that receives said data, that is, it needs to send said data out from the input port and the port has enabled the Reflective Relay function, the value of the Ingress_E-CID in the forwarded message information transmitted by said VLAN-aware Bridge Component is 0; otherwise, if the port has disabled the Reflective Relay function, the value of the Ingress_E-CID in the forwarded message information transmitted by said VLAN-aware Bridge Component is the ID value of the E-channel that receives data.

The Port Extender of the Controlling Bridge generates the E-tag according to the parameters in the EM-UNITDATA.request primitive, and fills the carried destination E-CID value into the E-CID field of the E-tag, and fills the value of the Ingress E-CID into the Ingress_E-CID field of the E-tag, if there is no Ingress_E-CID value, the Ingress_E-CID field is filled with 0.

The Extended Port of the Edge Port Extender needs to check the Ingress_E-CID field, if the value of the field value is consistent with the PCID of the port, the data is filtered out; if the field has a value of 0, no source port filtering is performed.

In order to facilitate the illustration of the present invention, the present invention will be described in further detail below with reference to the accompanying drawings and the specific embodiments. It should be noted that, in case of no conflict, the embodiments in the present application and the features of the embodiments can be combined randomly with each other.

Figure 1:
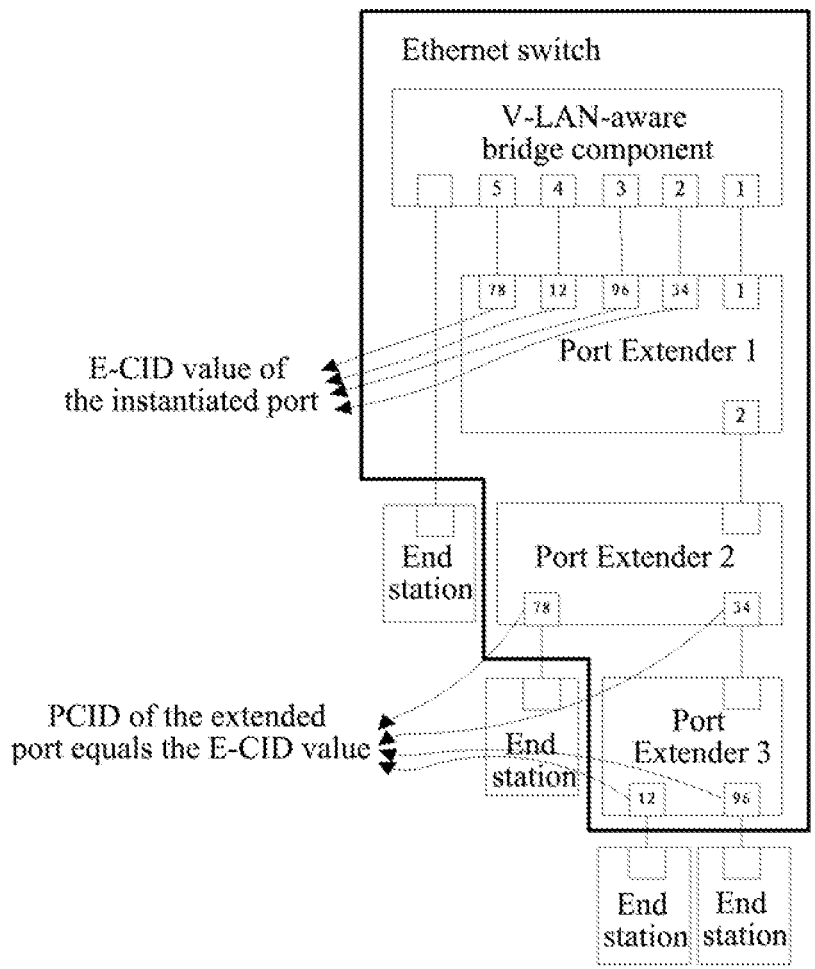
FIG. 1 is a schematic diagram when applying port extension to the Extended Bridge.
Figure 2:
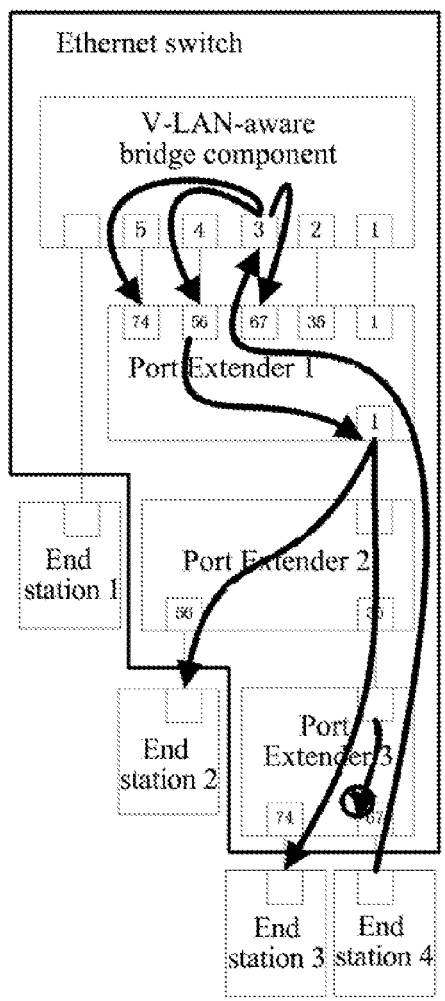
FIG. 2 is a schematic diagram of forwarding multicast data frames through Extended Bridge.
Figure 3:
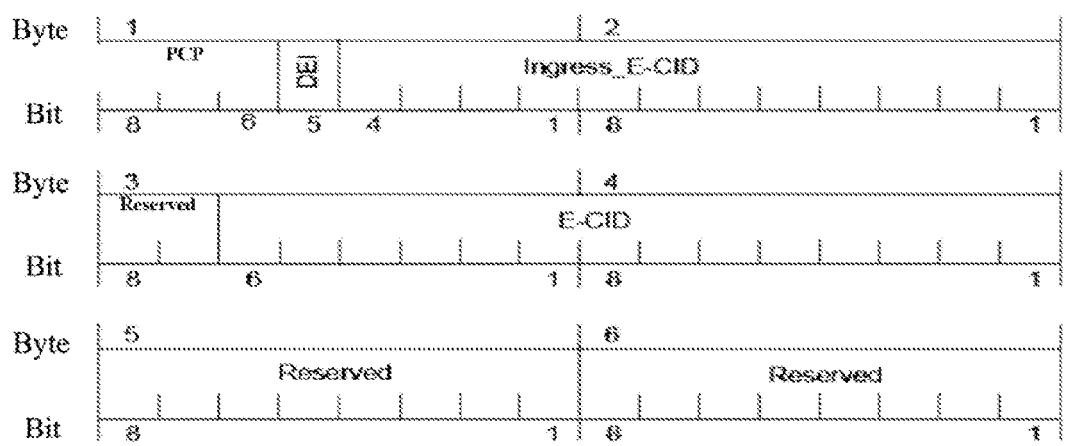
FIG. 3 is a schematic diagram of an E-tag format.
Figure 4:
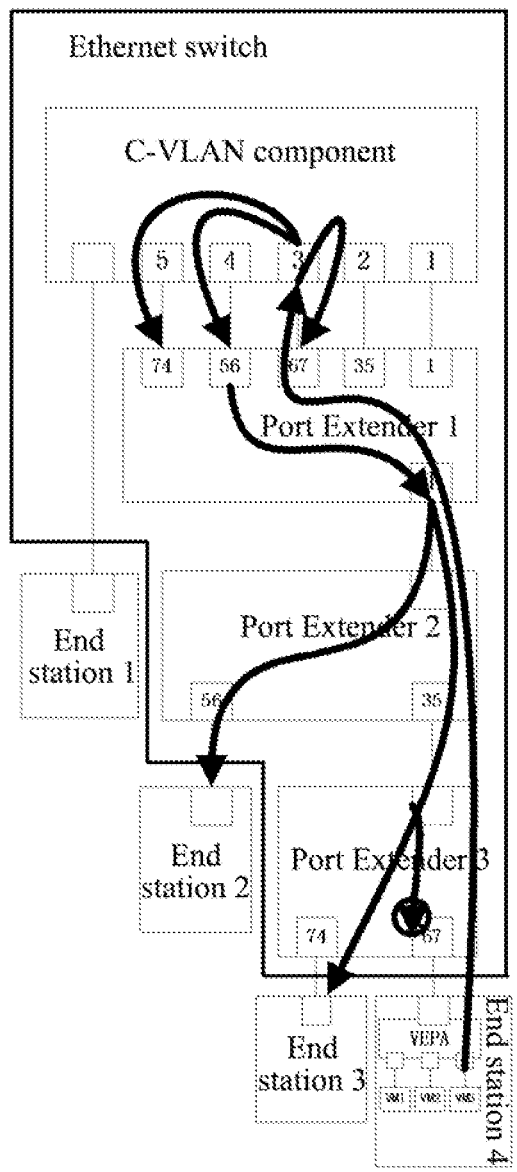
FIG. 4 is a schematic diagram of multicasting and forwarding of Extended Bridge according to the EVB technique.
Figure 5:
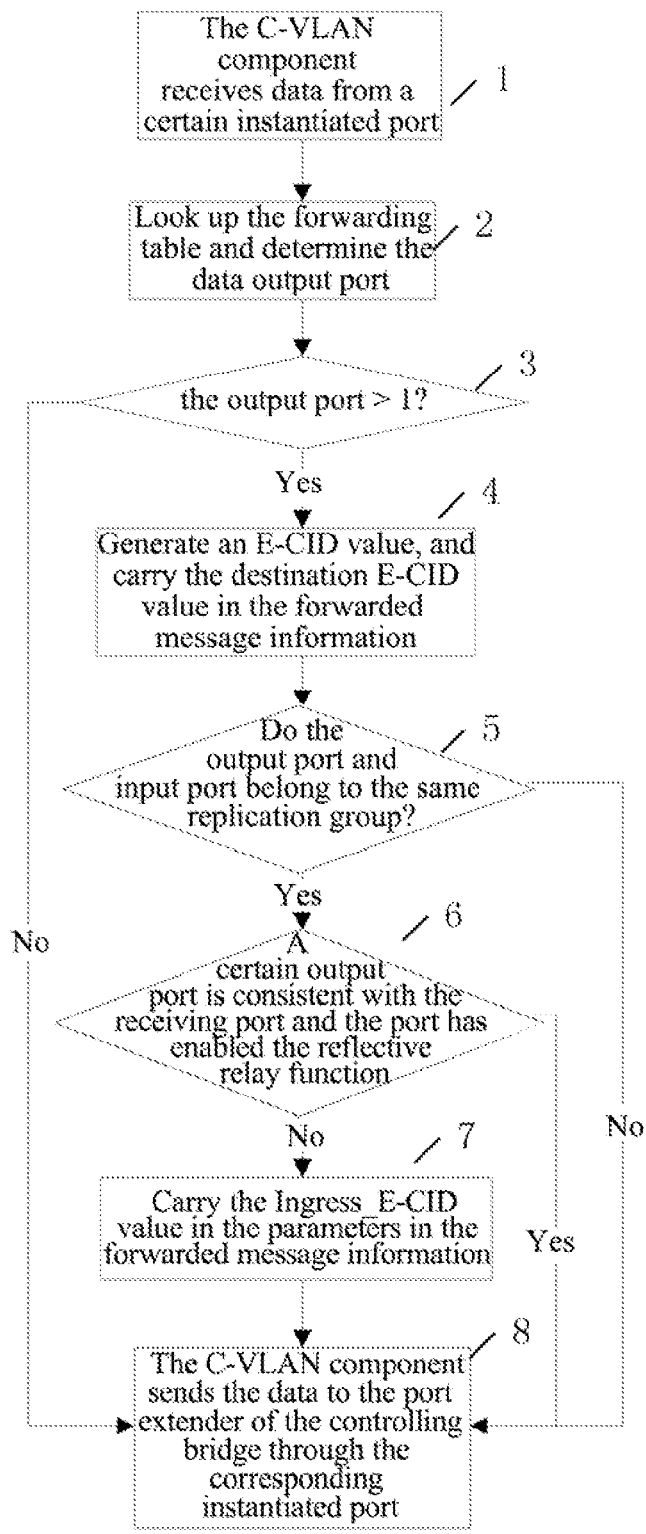
FIG. 5 is a processing flow chart of a C-VLAN Component forwarding multicast data in accordance with an embodiment of the present invention.

FIG. 5 shows the processing flow chart of the bridge forwarding module forwarding the multicast data. In this embodiment, the bridge forwarding module is the C-VLAN Component (C-VLAN Component is a typical example of VLAN-aware bridge module and is called as C-VLAN component or C-VLAN module).

Refer to FIG. 5, the specific steps of this process are described as follows:

step 1, the C-VLAN Component receives data sent from a certain instantiated port.

step 2, the C-VLAN Component searches in the forwarding table to determine the output port of the data.

step 3, whether it is multicast data or not, that is, whether the output port is greater than 1 or not is judged, if yes, proceed to step 4, otherwise, proceed to step 8.

step 4, if it is the multicast data, the C-VLAN Component needs to generate an E-CID value, and fills the value into the connection identifier parameter of the EM-UNITDATA.request primitive.

step 5, the C-VLAN Component judges whether the output port and input port belong to a same Replication Group or not, if they are, proceed to step 6, otherwise, proceed to step 8.

step 6, the C-VLAN Component continues to judge whether there is an output port consistent with the input port (that is, the data receiving port) and the port has enabled the Reflective Relay function, if yes, proceed directly to step 8; otherwise, proceed to step 7.

step 7, the C-VLAN Component needs to fill the value of the Ingress_E-CID into the connection identifier parameter of the EM-UNITDATA.request primitive.

step 8, the C-VLAN Component can directly send the data out through the output port obtained by searching the table.

In this embodiment, if in step 6 the C-VLAN Component determines that there is an output port consistent with the input port, and the port has enabled the Reflective Relay function, the data is directly sent out from the output port obtained by looking up the table (that is, it does not need to carry the value of the Ingress_E-CID). In other embodiments of the present invention, the C-VLAN Component may also carry the Ingress_E-CID, but the value of the Ingress_E-CID is 0.

Through the above-mentioned steps, the Port Extender 1 generates an E-tag (extended tag) according to the information transmitted by the C-VLAN Component. The destination E-CID value carried in the connection identifier in the EM-UITDATA.request primitive transmitted by the C-VLAN Component is filled in the E-CID field of the E-tag, and the value of the Ingress_E-CID is filled in the Ingress_E-CID field of the E-tag. If there is no Ingress_E-CID value, the Ingress_E-CID field is filled with 0. After the Port Extender 1 is filled with the E-tag, the multicast data is sent out through the Cascade Port. The intermediate cascaded Port Extender forwards the data according to the E-CID value. The Extended Port of the edge Port Extender will check the Ingress_E-CID field, if the value of the field is consistent with the PCID of the local port, the data is filtered out; if the field has a value of 0, no source port filtering is performed.

Figure 6:
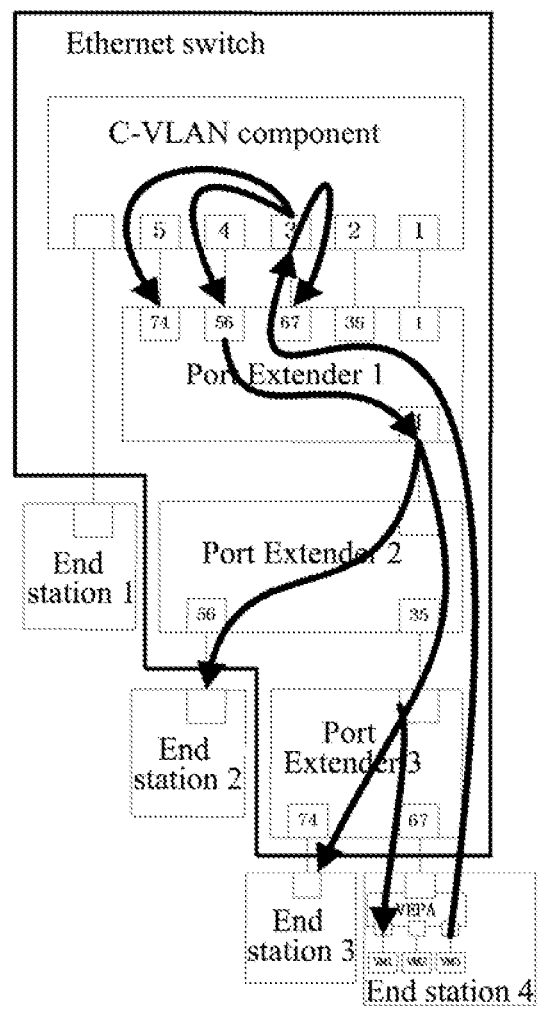
FIG. 6 is a schematic diagram of multicasting and forwarding of the Extended Bridge that supports the EVB technology in accordance with an embodiment of the present invention.

FIG. 6 illustrates the process of using the Extended Bridge supporting the EVB technology to forward multicast data frames. The End Station 4 uses the EVB technology and it supports three virtual machines (VMs). The three VMs are connected with the adjacent Extended Bridge through a physical interface. When the data frame of the VM3 in the End Station 4 passes through the edge Port Extender 3, the Port Extender 3 will add an E-tag into it, and the E-CID in the E-tag is the PCID of the port, which is 67 in FIG. 6. The intermediate Port Extender passed by the data frame when being forwarded to the direction of the switch is the Port Extender 2 shown in FIG. 6, which forwards the data frame to the upper level Port Extender after performing corresponding processing to the data frame. After the data frame arrives at the Port Extender 1, the E-tag is removed from the Extended Port connected with the C-VLAN Component and then the data frame is forwarded to the corresponding instantiated port of the C-VLAN Component. The instantiated port of the C-VLAN Component corresponds to the Extended Port where the data frame enters the Extended Bridge.

After the C-VLAN Component receives the data frame, it judges from which Extended Ports should the data frame be sent out according to the destination address and the VID. The C-VLAN Component determines that the multicast data should be sent from the instantiated ports 3, 4 and 5 to the Port Extender according to the corresponding relationship between the instantiated ports and the Extended Ports. Then, the C-VLAN Component generates the E-CID value and fills the E-CID value into the connection identifier parameter in the EM_UNITDATA.request primitive. Thereafter, the C-VLAN determines that the output port and input port belong to the same Replication Group because they are connected to the same internal Port Extender. The C-VLAN Component continues to compare the input port with the output port, and finds out that the port 3 is both input and output ports, and the port has enabled the Reflective Relay function, therefore, it does not need to perform the source port filtering, the connection identifier parameter in the EM_UNITDATA.request primitive will not carry the Ingress_E-CID any more, and and will be sent to the Port Extender in the Controlling Bridge.

For the received data frame, the port of the Port Extender forwards and filters the data frame according to the E-CID carried in the data frame. In this example, since only the port 56 on the Port Extender 1 belongs to member set of the E-channel identified by the E-CID. Therefore, although multiple copies of multicast data are sent out through the internal LAN between the C-VLAN Component and the internal Port Extender, only one port belonging to the E-channel identified by the E-CID on the Port Extender 1 receives the data. The forwarding unit of the Port Extender 1 generates the E-tag according to the EM-UITDATA.request primitive sent by the C-VLAN Component and fills in the E-CID of the E-tag with the E-CID in the connection identifier. Since in this embodiment, the connection identifier does not comprise the Ingress_E-CID, the Ingress_E-CID field of the E-tag in this embodiment is 0. After the Port Extender is added with E-tag, the multicast data is sent out through the Cascade Port. At the Port Extender 2, the data is sent to all member set ports, which are ports 56 and 35 in FIG. 6, of the E-channel identified by the E-CID according to the E-CID value in the E-tag. At the Port Extender 3 similarly, the data is sent to all member set ports, which are ports 74 and 67 in FIG. 6, of the E-channel identified by the E-CID according to the E-CID value in the E-tag.

It needs to perform source port filtering on the Extended Port according to the source E-CID value to prevent the circulating loop of the multicast data. After the Extended Port receives the data, it judges whether the destination E-CID value, i.e., the value of the E-CID field in the E-tag, is greater than 4095 or not. If not, it indicates that the data is unicast data, and the Port Extender directly sends the data to the port corresponding to the E-CID. Otherwise, it indicates that the data is multicast data, and the Port Extender continues to check the value of the Ingress_E-CID in the E-tag, and if this value is consistent with the PCID of the local port, the data is filtered out, if they are inconsistent or the value is 0, the source port filtering is not necessary. In this example, the port 67 checks the value of "Ingress_E-CID" and finds out that the value is 0, and it indicates that it does not need to perform the source port filtering, and the data is forwarded to the End Station 4, and the End Station 4 completes the source port filtering of the multicast data.

Furthermore, the embodiment of the present invention also provides a multicast data forwarding device supporting virtual terminal to be applied to an Ethernet switch, the main device comprising a port determination unit and a forwarding determination unit in a bridge forwarding module, wherein, the port determination unit is configured to: receive multicast data sent by an end station and determine an output port;

the forwarding determination unit is configured to: according to the output port determined by the port determination unit, when a certain output port is the same with the input port of the multicast data and the input port has enabled reflective relay function, not carry ingress extended channel identifier (Ingress-E-CID) in the forwarded message information or the value of the Ingress-E-CID equals 0.

Furthermore, the forwarding determination unit is further configured to: determine the E-CID value carried in the forwarded message information.

Furthermore, the forwarding determination unit is further configured to: determine that the output port and input port belong to a same replication group.

Furthermore, the bridge forwarding module refers to a VLAN-aware Bridge Component in a Controlling Bridge in an Ethernet switch; the device further comprises an edge port extended forwarding module, and an internal port extended forwarding module in the Controlling Bridge.

The internal port extended forwarding module is configured to: after receiving the forwarded message information, according to the Ingress_E-CID carried in the forwarded message information, add an extended tag (E-tag) into the multicast data;

the edge port extended forwarding module is configured to: after receiving the multicast data from the extended port, check the value of the Ingress-E-CID in the E-tag, and if the value of the Ingress E-CID value is consistent the PCID of the extended port, filter the data out.

Furthermore, the embodiment of the present invention also provides another multicast data forwarding device supporting virtual terminal to be applied to an Ethernet switch, and the device mainly comprises a port determination unit and a forwarding determination unit in a bridge forwarding module, wherein, the port determination unit is configured to: receive multicast data sent by an end station and determine an output port;

the forwarding determination unit is configured to: according to the output port determined by the port determination unit, when a certain output port and the input port belong to a same replication group and the input port has disabled the reflective relay function, carry an Ingress-E-CID in the forwarded message information and the value of the carried Ingress-E-CID is the E-CID used when inputting the multicast data.

Furthermore, the forwarding determination unit is further configured to: determine the value of the E-CID carried in the forwarded message information.

Furthermore, the forwarding determination unit is further configured to: determine that the output port and input port belong to a same replication group.

The above description is only preferred embodiments of the present invention and is not intended to limit the present invention. The present invention may also have a variety of other embodiments, and, those skilled in the field can make various changes and modifications based on the present invention accordingly without departing from the spirit and substance of the present invention. These changes and modifications should fall within the protection scope of the appended claims of the present invention.

Obviously, those skilled in the field should understand that each module or step of the present invention can be implemented with a general-purpose computing device, they can be integrated in a single computing device, or distributed in a network consisting of multiple computing devices, optionally, they can be implemented with the computing device executable codes, therefore, they can be stored in the storage device and executed by the computing device. In some cases, an order different from that used in this specification can be used to execute the shown and described steps, or they can be made into separate IC modules, or multiple modules or steps can be made into a single integrated circuit module. Therefore, the present invention is not limited to any particular hardware and software combination.

INDUSTRIAL APPLICABILITY

The multicast data forwarding scheme provided in the embodiments of the present invention can transmit and receive multicast data normally through modifying the source port filtering mechanism in the scenario of supporting virtual terminal.

What is claimed is:

1. A multicast data forwarding method supporting virtual terminal, comprising: a bridge forwarding module receiving multicast data sent by an end station and determining an output port, when a certain output port is the same with the input port of said multicast data and said input port has enabled a reflective relay function, not carrying an ingress extended channel identifier (Ingress_E-CID) in forwarded message information or the value of said Ingress_E-CID being equal to 0.

2. The method according to claim 1, further comprising: said bridge forwarding module also determining the value of extended channel identifier (E-CID) carried in said forwarded message information.

3. The method according to claim 2, wherein, said bridge forwarding module refers to a VLAN-aware Bridge Component in a Controlling Bridge in an Ethernet switch.

4. The method according to claim 1, wherein, said input port and output port belong to a same replication group.

5. The method according to claim 4, wherein, said bridge forwarding module refers to a VLAN-aware Bridge Component in a Controlling Bridge in an Ethernet switch.

6. The method according to claim 1, wherein, said bridge forwarding module refers to a VLAN-aware Bridge Component in a Controlling Bridge in an Ethernet switch.

7. The method according to claim 6, wherein, after receiving said forwarded message information, an internal port extended forwarding module (Port Extender) of said Controlling Bridge adds an extended tag (E-tag) into said multicast data according to said Ingress_E-CID carried in said forwarded message information;

after receiving said multicast data, an Extended Port of an Edge Port Extender checks the value of said Ingress_E-CID in said E-tag, and if the value of said Ingress_E-CID is consistent with a port extended channel identifier (PCID) of said extended port, said data is filtered out.

8. A multicast data forwarding method supporting virtual terminal, comprising: a bridge forwarding module receiving multicast data sent by an end station and determining an output port, when a certain output port is the same with the input port of said multicast data and said input port has disabled a reflective relay function, carrying an ingress extended channel identifier (Ingress_E-CID) in forwarded message information and the value of said carried Ingress_E-CID being equal to E-CID when said multicast data is inputted.

9. The method according to claim 8, further comprising:
said bridge forwarding module also determining the value of said E-CID carried in said forwarded message information.

10. The method according to claim 9, wherein,
said input port and output port belong to a same replication group.

11. The method according to claim 8, wherein,
said input port and output port belong to a same replication group.

12. A multicast data forwarding device supporting virtual terminal, applied to an Ethernet switch, said device comprising a processor which executes the steps in a port determination unit and a forwarding determination unit in a bridge forwarding module, wherein,
said port determination unit is configured to: receive multicast data sent by an end station and determine an output port;
said forwarding determination unit is configured to: according to said output port determined by said port determination unit, when a certain output port is the same with the input port of said multicast data and said input port has enabled a reflective relay function, not carry ingress extended channel identifier (Ingress_E-CID) in forwarded message information or make the value of said Ingress_E-CID equal 0.

13. The device according to claim 12, wherein,
said forwarding determination unit is further configured to: determine the value of E-CID carried in said forwarded message information.

14. The device according to claim 13, wherein,
said bridge forwarding module refers to a VLAN-aware Bridge Component in a Controlling Bridge in an Ethernet switch; said processor in said device further executes the steps in an edge port extended forwarding module, and an internal port extended forwarding module in said Controlling Bridge;
said internal port extended forwarding module is configured to: after receiving said forwarded message information, according to said Ingress_E-CID carried in said forwarded message information, add an extended tag (E-tag) into said multicast data;
said edge port extended forwarding module is configured to: after receiving said multicast data from an extended port, check the value of said Ingress_E-CID value in said E-tag, and if the value of said Ingress E-CID is consistent with PCID of said extended port, filter out said data.

15. The device according to claim 12, wherein,
said forwarding determination unit is further configured to: determine that said output port and input port belong to a same replication group.

16. The device according to claim 15, wherein, said bridge forwarding module refers to a VLAN-aware Bridge Component in a Controlling Bridge in an Ethernet switch; said processor in said device further executes the steps in an edge port extended forwarding module, and an internal port extended forwarding module in said Controlling Bridge;
said internal port extended forwarding module is configured to: after receiving said forwarded message information, according to said Ingress_E-CID carried in said forwarded message information, add an extended tag (E-tag) into said multicast data;
said edge port extended forwarding module is configured to: after receiving said multicast data from an extended port, check the value of said Ingress_E-CID value in said E-tag, and if the value of said Ingress E-CID is consistent with PCID of said extended port, filter out said data.

17. The device according to claim 12, wherein,
said bridge forwarding module refers to a VLAN-aware Bridge Component in a Controlling Bridge in an Ethernet switch; said processor in said device further executes the steps in an edge port extended forwarding module, and an internal port extended forwarding module in said Controlling Bridge;
said internal port extended forwarding module is configured to: after receiving said forwarded message information, according to said Ingress_E-CID carried in said forwarded message information, add an extended tag (E-tag) into said multicast data;
said edge port extended forwarding module is configured to: after receiving said multicast data from an extended port, check the value of said Ingress_E-CID value in said E-tag, and if the value of said Ingress E-CID is consistent with PCID of said extended port, filter out said data.

18. A multicast data forwarding device supporting virtual terminal, applied to an Ethernet switch, said device comprising a processor which executes the steps in a port determination unit and a forwarding determination unit in a bridge forwarding module, wherein,
said port determination unit is configured to: receive multicast data sent by an end station and determine an output port;
said forwarding determination unit is configured to: according to said output port determined by said port determination unit, when a certain output port is the same with the input port of said multicast data and said input port has disabled a reflective relay function, carrying an ingress extended channel identifier (Ingress_E-CID) in forwarded message information and make the value of said carried Ingress_E-CID equal E-CID used when inputting said multicast data.

19. The device according to claim 18, wherein,
said forwarding determination unit is further configured to: determine the value of said E-CID carried in said forwarded message information.

20. The device according to claim 18, wherein,
said forwarding determination unit is further configured to: determine that said output port and input port belong to a same replication group.

* * * * *